Sept. 8, 1936.  L. S. DEITZ, JR  2,053,656

METHOD OF REFINING METALS

Filed May 15, 1935

INVENTOR
L. S. DEITZ JR.
BY
E.R. Nowlan
ATTORNEY

Patented Sept. 8, 1936

2,053,656

UNITED STATES PATENT OFFICE 2,053,656

METHOD OF REFINING METALS

Louis S. Deitz, Jr., Metuchen, N. J., assignor, by mesne assignments, to Nassau Smelting and Refining Company, New York, N. Y., a corporation of New York Application May 15, 1935, Serial No. 21,539

17 Claims. (Cl. 75—78)

This invention relates to a method of refining metals and more particularly to a method of refining lead to a high degree of freedom from tin, cadmium and zinc.

In the manufacture of lead covered electrical conductor cables particularly as used in the communications art, a seamless sheath of lead or lead alloy is formed on the cable by an extrusion process. This lead or lead alloy must have certain physical characteristics in order to be extruded satisfactorily as a continuous and substantially uniform sheath, and these physical characteristics are dependent upon the chemical composition of the sheathing material. In particular certain alloys comprising principally lead with a content of antimony from about 0.50% to about 1.50% are found to be capable of being extruded satisfactorily and of forming a relatively tough, flexible and wear and corrosion resistant sheath, provided that tin, zinc and cadmium are present in amounts less than .005% each and preferably less than .002% each.

It is common practice to employ sheathing materials made of metals obtained by refining old or discarded cable sheaths. Many of the old cable sheaths were made of lead alloys containing substantial quantities of tin and other elements, and in addition many cable sheaths have joints or repairs made therein with solder or other tin bearing materials, which are included in the scrap metals obtained therefrom. A proportion also of the raw lead and antimony which may be available for the manufacture of the lead antimony alloy may carry tin, cadmium or zinc or more than one of these in amounts to bring their individual content in the alloy well above .005%.

An object of the present invention is to provide a simple, rapid and effective method of removing tin, cadmium and zinc from lead and lead alloys.

One embodiment of the method contemplates the addition of copper to molten lead or lead alloy and skimming off the dross formed on the surface of the metal, this being found to contain the greater part of the added copper and also substantially all tin, cadmium or zinc present in amounts exceeding .005% each.

Other objects and features of the invention will appear from the following detailed description of one embodiment thereof taken in connection with the accompanying drawing in which like reference numerals are applied to identical parts in the several figures and in which Fig. 1 is a plan view of a test specimen of lead antimony alloy made in accordance with the invention;

In the embodiment of the invention herein disclosed a quantity of lead or of lead alloy containing tin, cadmium or zinc or more than one of these as impurities in amounts exceeding .005% each, is melted in any convenient furnace, such as an externally fired iron kettle and brought to a temperature of approximately 900° F. Lead at this temperature will normally dissolve about .12% copper. From five to ten times an amount of copper representing .12% of the weight of the molten charge is added to the metal in the kettle. This copper may be added preferably in the form of pieces of fine copper wire or in the form of a granulated copper-lead mixture. The charge is stirred until it has taken up as much copper as it will.

The mixture is then allowed to cool to a little above its melting point, and is stirred mechanically while air is blown through the mass. During this procedure most of the dissolved copper comes out in the dross which forms on the surface and apparently brings with it any tin, cadmium or zinc since, the dross being skimmed off, the metal is found to be free of tin, cadmium or zinc in excess of .005% each. In fact the content of any of these impurities is ordinarily found to be below .002%.

In one instance, a charge of 60,000 lbs. of impure lead resulting from a detinning operation carried out on material obtained from scrap cable sheaths originally made from a lead-tin alloy, was melted in an iron kettle furnace at about 900° F. The material had the following impurities present in the amounts shown:

| | Percent |
|---|---|
| Tin | .010 |
| Copper | .040 |
| Arsenic | .002 |
| Iron | .005 |
| Bismuth | .068 |
| Zinc | .002 |

The tin content in this case was the principal objectionable feature of the material.

Sufficient high grade antimony was added to bring this component to approximate 1.0%, i. e. about 600 lbs., and the charge was stirred until the antimony was dissolved and the mixture substantially homogeneous.

A charge of about 50 lbs. of copper wire was added and the bath stirred for two hours in order that as much copper as possible might be dissolved. The temperature was then reduced to about 650° F. and the dross skimmed off. The metal was then heated again to about 850° F. and stirred mechanically while air was blown through the molten mass for some six hours.

Figure 1:
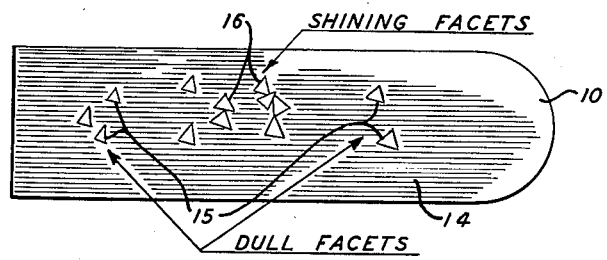
Figure 2:
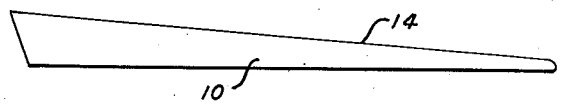
Fig. 2 is a side elevation thereof.
Figure 3:
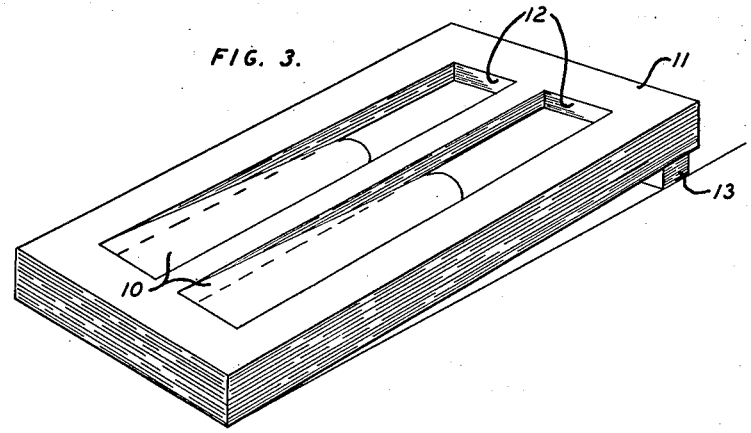
Fig. 3 is a perspective view on a smaller scale of a mold containing test specimens.

During the latter period when the process was thought to be nearly finished test specimens 10 such as shown in Fig. 1 were cast in a mold 11 having rectangular recesses 12 therein and tilted from the horizontal by means of a block 13. The free surface 14 of these specimens showed a number of generally triangular flakes or facets 15 spontaneously formed thereon having a bright pewter colored but dully frosted appearance. These flakes occur singly or in clusters and are characteristic of alloys of lead with antimony.

At a certain point in the process another kind of flake or facet 16 began to appear on the test specimens. These are similar in size and shape to the flakes 15 but have a strikingly different surface texture in that they have a brilliantly polished mirror-like surface. It has been found that these mirror-like or specular facets are formed only when the tin, cadmium or zinc content of a lead antimony alloy containing about 1% of antimony is less than .005% each, so that the appearance of these specular facets on test specimens is a reliable test of purity in this respect.

This process of testing is not a part of the present invention, being disclosed and claimed in copending application Serial No. 21,538 filed on May 15, 1935 by the present inventor and another.

The metal was then cast in bars for storage and later used and contained the following impurities in the amounts shown:

| | Percent |
|---|---|
| Tin | .002 at most |
| Copper | .060 |
| Bismuth | .068 |
| Arsenic | .002 at most |

The role of the copper in the process is not understood at present in detail, but in practice it appears unquestionably to tend to dissolve in the lead at relatively high temperatures and when the temperature of the charge is then reduced the bivalent and tetravalent metals present as impurities come out into the slag or dross with the reprecipitated copper or copper oxid, presumably as oxids of tin, cadmium, zinc, etc. The pentavalent metals, arsenic, antimony and bismuth are apparently not affected, at least until after the preceding ones are removed, nor are iron, aluminum and others not of the same chemical groups as tin, cadmium and zinc. In practice the removal of tin, cadmium and zinc can be accomplished much more rapidly by the use of copper in the manner described and with complete practical efficiency. In some instances and particularly on a relatively small scale it is found that lead antimony sufficiently pure to give test specimens having the specular or mirror-like flakes, can be produced by the aid of copper without mechanical or air blast agitation.

Instead of blowing air through the molten material in the low temperature part of the process after the copper has been dissolved, the surface may be covered with a layer of molten caustic soda containing an oxidizing agent such as sodium nitrate and the charge stirred mechanically in contact therewith until the copper is precipitated as dross driving tin, cadmium and zinc out also.

The embodiment of the invention herein disclosed is merely illustrative and may be modified and departed from in many ways without departing from the spirit and scope of the invention as pointed out in and limited only by the appended claims.

What is claimed is:

1. A method of refining lead and lead alloys which comprises the steps of melting the lead material, adding copper thereto at a relatively high temperature, cooling to a relatively low temperature, and separating the purified lead material and the resulting dross.

2. A method of refining lead and lead alloys which comprises the steps of melting the lead material, adding copper thereto at a relatively high temperature, and cooling to a relatively low temperature to remove therefrom tin, cadmium and zinc present as impurities.

3. A method of refining lead and lead alloys which comprises the steps of melting the lead material at a relatively high temperature, adding copper thereto and stirring to dissolve copper therein, cooling to a relatively low temperature, and separating the purified lead material and the resulting dross.

4. A method of refining lead and lead alloys which comprises the steps of melting the lead material at a relatively high temperature, adding copper thereto and stirring to dissolve copper therein, and cooling to a relatively low temperature, whereby the dissolved copper precipitates out in dross bringing with it tin, cadmium and zinc present as impurities.

5. A method of refining lead and lead alloys which comprises the steps of melting the lead material, raising the molten metal to about 900° F., adding copper thereto and stirring, and reducing the temperature to about 650° F.

6. A method of refining lead and lead alloys which comprises the steps of melting the lead material, raising the molten metal to about 900° F., adding copper thereto and stirring, reducing the temperature to about 650° F., and skimming off the dross formed thereon.

7. A method of refining lead and lead alloys which comprises the steps of melting the material at a relatively high temperature, adding copper thereto and stirring to dissolve copper therein, cooling to a relatively low but still melting temperature, and treating the molten material with an oxidizing agent while at the low temperature, whereby the dissolved copper precipitates out in dross bringing with it tin, cadmium and zinc present as impurities.

8. A method of refining lead and lead alloys which comprises the steps of melting the material at a relatively high temperature, adding copper thereto and stirring to dissolve copper therein, cooling to a relatively low but still melting temperature, and agitating the molten material in contact with an oxidizing agent while at the low temperature, whereby the dissolved copper precipitates out in dross bringing with it tin, cadmium and zinc present as impurities.

9. A method of refining lead and lead alloys which comprises the steps of melting the material at a relatively high temperature, adding copper thereto and stirring to dissolve copper therein, cooling to a relatively low but still melting temperature, and stirring the molten material and blowing air therethrough while at the low temperature, whereby the dissolved copper precipitates out in dross bringing with it tin, cadmium and zinc present as impurities.

10. A method of refining lead and lead alloys which comprises treating the molten material with a reagent which removes the greater part of some of the impurities therein, and then treating the molten material with copper to remove substantially all the rest of the said impurities.

11. A method of refining lead and lead alloys which comprises treating the molten material with a reagent which removes the greater part of any tin, cadmium and zinc present as impurities, and then treating the molten material with copper to remove substantially all the rest of the said impurities.

12. A method of refining lead and lead alloys which comprises the steps of treating the molten lead material with copper to remove impurities therefrom and then separating the purified lead material and the resulting dross containing copper and impurities.

13. A method of refining lead and lead alloys which comprises the steps of treating the molten lead material with copper to remove tin, cadmium and zinc present as impurities therefrom and then separating the purified lead material and the resulting dross containing copper and impurities.

14. A method of refining lead and lead alloys containing antimony which comprises the steps of melting the lead material, and treating the melted material with copper until cast test specimens thereof show mirror bright flakes on a free surface thereof.

15. A method of refining lead and lead alloys containing antimony which comprises the steps of melting the lead material, treating the melted material with copper at a relatively high temperature, and cooling to a relatively low temperature and holding the melted material at such temperature until cast test specimens thereof show mirror bright flakes on a free surface thereof.

16. A method of refining lead and lead alloys which comprises the steps of melting the lead material, raising the molten metal to about 900° F., adding copper thereto and stirring, reducing the temperature to about 650° F., and holding the melted material at such temperature until cast test specimens thereof show mirror bright flakes on a free surface thereof.

17. A method of refining lead and lead alloys which comprises the steps of melting the lead material, treating the molten material with an oxidizing agent to remove the greater part of some of the impurities therein, and treating the molten material with copper to remove substantially all the rest of the said impurities.

LOUIS S. DEITZ, Jr.